(12) United States Patent
Chen (10) Patent No.: US 9,156,091 B2
(45) Date of Patent: Oct. 13, 2015

(54) BORING HEAD

(71) Applicant: Chin-Chiu Chen, Taichung (TW)

(72) Inventor: Chin-Chiu Chen, Taichung (TW)

( * ) Notice: Subject to any disclaimer, the term of this patent is extended or adjusted under 35 U.S.C. 154(b) by 322 days.

(21) Appl. No.: 13/734,107

(22) Filed: Jan. 4, 2013

(65) Prior Publication Data

US 2014/0193221 A1 Jul. 10, 2014

(51) Int. Cl.
*B23B 29/00* (2006.01)
*B23B 29/04* (2006.01)
*B23B 29/034* (2006.01)

(52) U.S. Cl.
CPC ......... *B23B 29/046* (2013.01); *B23B 29/03407* (2013.01); *Y10T 408/95* (2015.01)

(58) Field of Classification Search
CPC ............ B23B 29/03407; B23B 29/046; Y10T 408/95
USPC ............. 408/181, 185, 184, 199, 238, 239 R, 408/153; 407/39, 83, 89, 101, 46, 103, 102, 407/48, 40, 33, 22
See application file for complete search history.

(56) References Cited

U.S. PATENT DOCUMENTS

| | | | | |
|---|---|---|---|---|
| 3,125,798 | A * | 3/1964 | Stein | 407/83 |
| 4,627,771 | A * | 12/1986 | Kieninger | 407/39 |
| 5,123,787 | A * | 6/1992 | Hunt | 407/39 |
| 7,156,588 | B2 * | 1/2007 | Elbaz et al. | 408/190 |
| 2010/0178117 | A1 * | 7/2010 | Watanabe et al. | 407/11 |

* cited by examiner

*Primary Examiner* — Eric A Gates
*Assistant Examiner* — Paul M Janeski
(74) *Attorney, Agent, or Firm* — Ming Chow; Sinorica, LLC (57) ABSTRACT

A boring head has a connecting rod, an extending bracket and a cutter mount. The extending bracket is detachably connected with the connecting rod. The cutter mount is securely connected with a front end of the extending bracket. Because the extending bracket is detachably connected with the connecting rod, the extending bracket is replaceable, and the length of the extending bracket can be changed to make a bore with a desired diameter.

3 Claims, 9 Drawing Sheets

BORING HEAD

BACKGROUND OF THE INVENTION

1. Field of the Invention

The present invention relates to a boring head, and more particularly to a boring head with a replaceable design.

2. Description of Related Art

Figure 9:
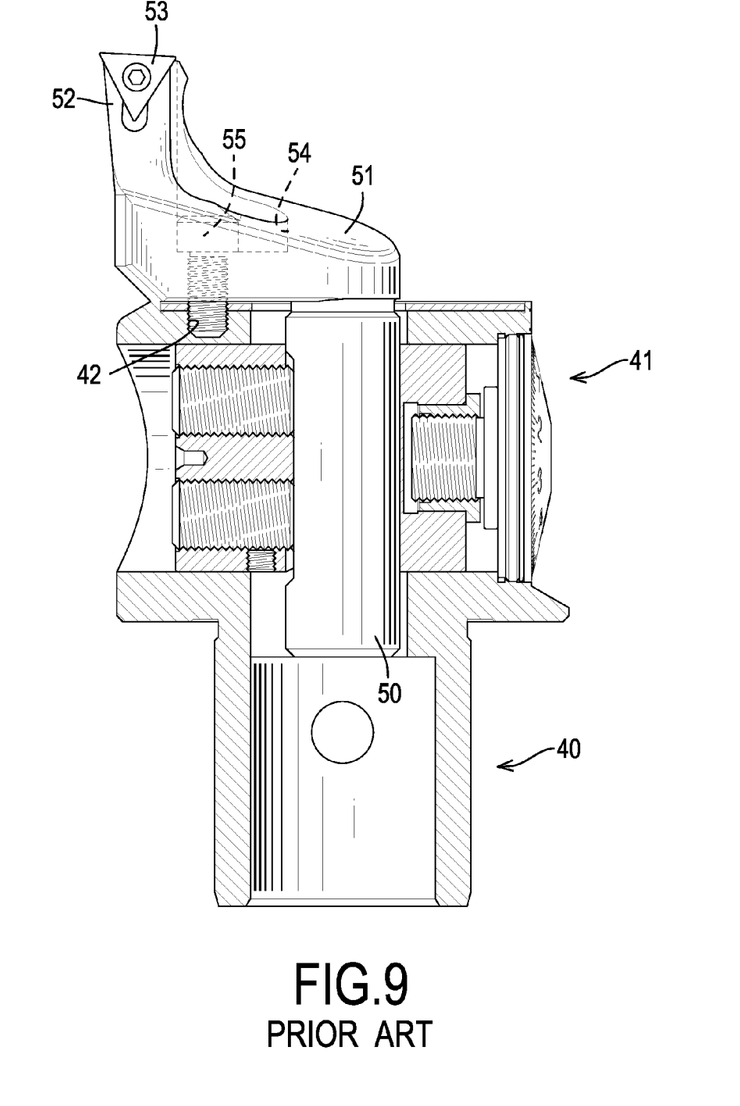
FIG. 9 is an operational side view in partial section of a conventional boring head in accordance with the prior art, showing the boring head is inserted into the adjusting base.

With reference to FIG. 9, a conventional boring head has a connecting rod 50, an extending bracket 51, a cutter mount 52 and an auxiliary hole 54. The connecting rod 50 has a round cross section and a top end. The extending bracket 51 is integrally connected with the top end of the connecting rod 50 and extends latitudinally. The cutter mount 52 is integrally connected with a front end of the extending bracket 51 and protrudes upwardly. The auxiliary hole 54 is elongated, is formed through the extending bracket 51 and extends toward the front end and a rear end of the extending bracket 51. An auxiliary bolt 55 is mounted through the auxiliary hole 54.

The boring head is mounted on a conventional adjusting base 40 and is to be moved latitudinally. The adjusting base 40 has an adjusting structure 41 and a base threaded hole 42. The adjusting structure 41 is mounted inside a top of the adjusting base 40. The base threaded hole 42 is formed in a top surface of the adjusting base 40.

The connecting rod 50 of the boring head is inserted into and positioned by the adjusting structure 41. A cutter 53 is securely mounted on the cutter mount 52. The auxiliary bolt 55 is mounted through the auxiliary hole 54 and is screwed into the base threaded hole 42. Accordingly, the boring head is securely mounted on the adjusting base 40 for subsequent boring operation.

When the boring head is moved latitudinally, a desired diameter of a bore can be adjusted. The procedures of moving the boring head are as follows.

First, the auxiliary bolt 55 is loosened, and then the adjusting structure 41 is operated to move the boring head latitudinally to a desired position. Second, the auxiliary bolt 55 is screwed into the base threaded hole 42 again to secure the boring head.

However, the adjusting range of the adjusting structure 41 is limited, and is insufficient when the desired diameter of the bore is large. Consequently, multiple boring heads with different lengths have to be prepared, and a cost of purchasing different boring heads is increased. Further, assembling and disassembling the connecting rod 50 is inconvenient each time the boring head is replaced.

To overcome the shortcomings, the present invention tends to provide a boring head to mitigate the aforementioned problems.

SUMMARY OF THE INVENTION

The main objective of the invention is to provide a boring head with a replaceable design.

A boring head has a connecting rod, an extending bracket and a cutter mount. The extending bracket is detachably connected with the connecting rod. The cutter mount is securely connected with a front end of the extending bracket. Because the extending bracket is detachably connected with the connecting rod, the extending bracket is replaceable, and the length of the extending bracket can be changed to make a bore with a desired diameter.

Other objects, advantages and novel features of the invention will become more apparent from the following detailed description when taken in conjunction with the accompanying drawings.

DETAILED DESCRIPTION OF PREFERRED EMBODIMENT

Figure 1:
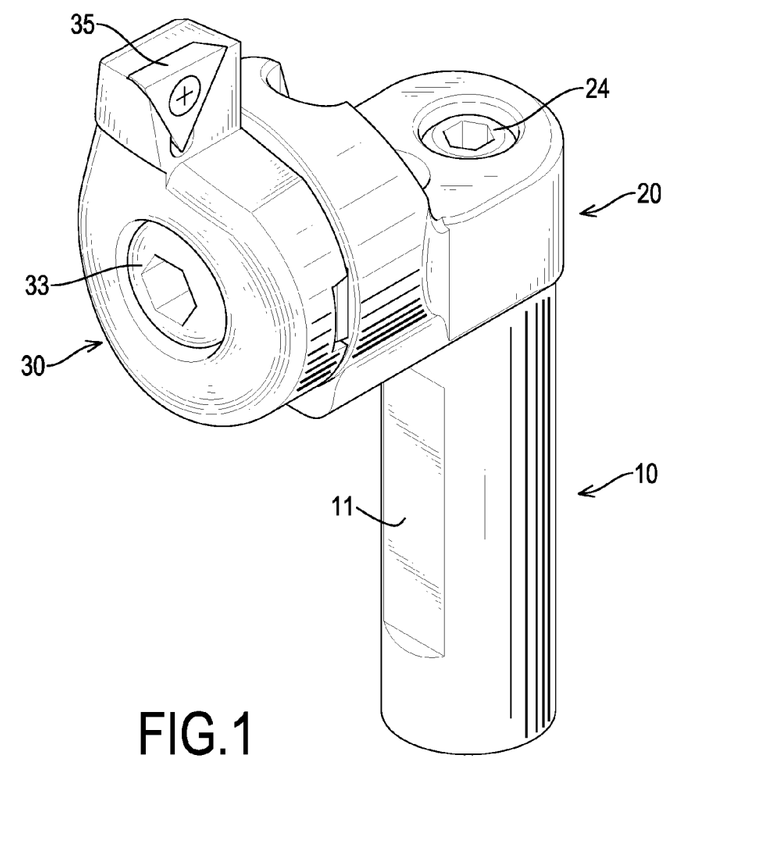
FIG. 1 is a perspective front view of a first embodiment of a boring head in accordance with the present invention.
Figure 2:
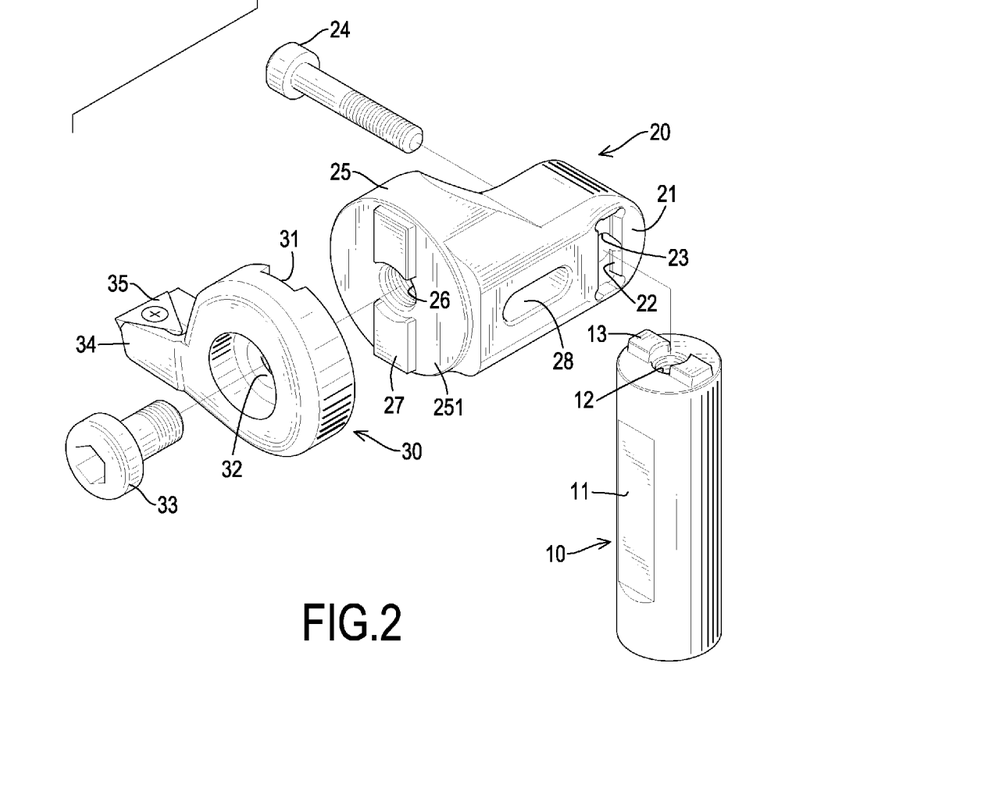
FIG. 2 is an exploded perspective view of the boring head in FIG. 1.
Figure 3:
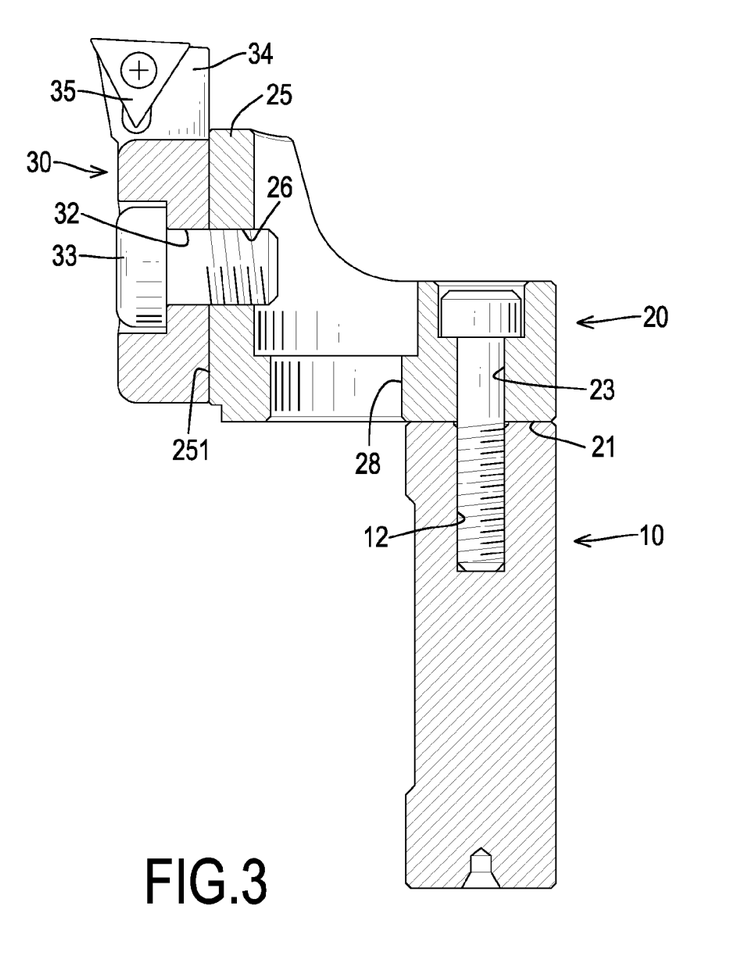
FIG. 3 is a side view in partial section of the boring head in FIG. 1.

With reference to FIGS. 1 to 3, a first embodiment of a boring head in accordance with the present invention comprises a connecting rod 10, an extending bracket 20 and a cutter mount 30.

The connecting rod 10 is linear and has a cross section, an outer surface, a top surface, a pressed surface 11, a rod threaded hole 12 and two rod protrusions 13.

The cross section of the connecting rod 10 is round. The top surface of the connecting rod 10 has a central section. The pressed surface 11 is flat and is formed on the outer surface of the connecting rod 10. The rod threaded hole 12 is formed in the central section of the top surface of the connecting rod 10. The rod protrusions 13 protrude from the top surface of the connecting rod 10 and are respectively located at two opposite sides of an opening of the rod threaded hole 12.

The extending bracket 20 is detachably connected with the connecting rod 10 and has a main body and a bracket bolt 24. The main body of the extending bracket 20 extends horizontally and has a front end, a rear end, an abutted surface 21, a bracket aperture 23 and an auxiliary hole 28. The rear end of the main body is opposite to the front end of the main body. The abutted surface 21 is flat, is formed on an outer surface of the rear end of the main body, and abuts the top surface of the connecting rod 10.

The bracket aperture 23 is formed through the rear end of the main body and aligns with the rod threaded hole 12.

The bracket bolt 24 is mounted through the bracket aperture 23 and is screwed into the rod threaded hole 12.

Preferably, the main body of the extending bracket 20 has a bracket recess 22, a connecting section 25, a bracket threaded hole 26 and two bracket protrusions 27.

The bracket recess 22 is formed in the abutted surface 21 and is securely disposed around the two rod protrusions 13. The bracket aperture 23 is formed through a central section of a bottom of the bracket recess 22.

The connecting section 25 is formed on the front end of the main body and has a longitudinally flat front surface 251.

The bracket threaded hole 26 is formed in a central section of the front surface 251 of the connecting section 25.

The bracket protrusions 27 protrude from the front surface 251 and are respectively located at two opposite sides of an opening of the bracket threaded hole 26.

The auxiliary hole 28 is elongated, is formed through the main body and extends toward the front end and the rear end of the main body.

The cutter mount 30 is securely connected with the front end of the main body and has a main portion, a mount bolt 33 and a cutter-mounting protuberance 34.

The main portion of the cutter mount 30 has a front end, a rear end, a mount recess 31 and a mount aperture 32.

The rear end of the main portion of the cutter mount 30 is opposite to the front end of the main portion of the cutter mount 30 and abuts the front surface 251.

The mount recess 31 is formed in the rear end of the main portion and is securely disposed around the two bracket protrusions 27.

The mount aperture 32 is formed through the front end and the rear end of the main portion and is formed through a central section of the mount recess 31.

The mount bolt 33 is mounted through the mount aperture 32 and is screwed into the bracket threaded hole 26 such that the cutter mount 30 is securely connected with the extending bracket 20.

The cutter-mounting protuberance 34 is formed on the main portion, protrudes upwardly and is capable of being securely connected with a cutter 35 by a screw.

Alternatively, the cutter mount 30 may be integrally connected with the front end of the main body of the extending bracket 20. The present invention does not limit that the cutter mount 30 is detachably or integrally connected with the extending bracket 20.

Figure 4:
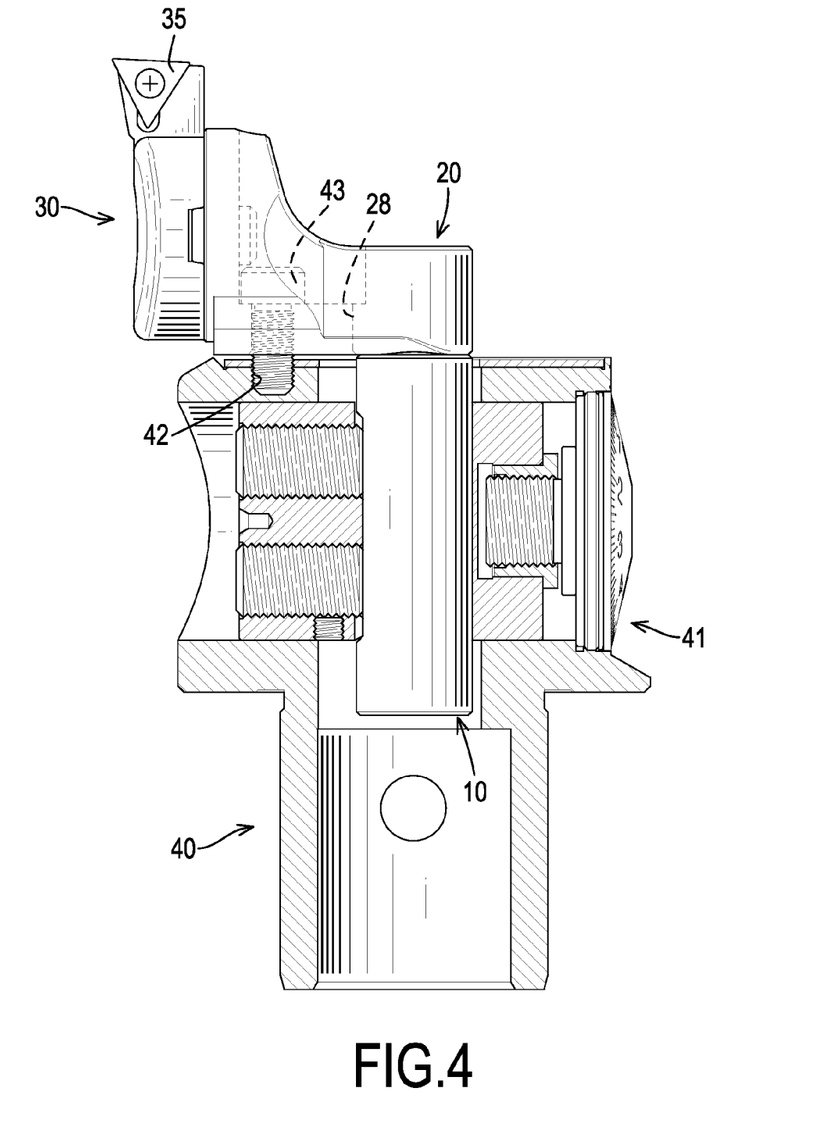
FIG. 4 is an operational side view in partial section of the boring head in FIG. 1 showing the boring head is inserted into an adjusting base.
Figure 5:
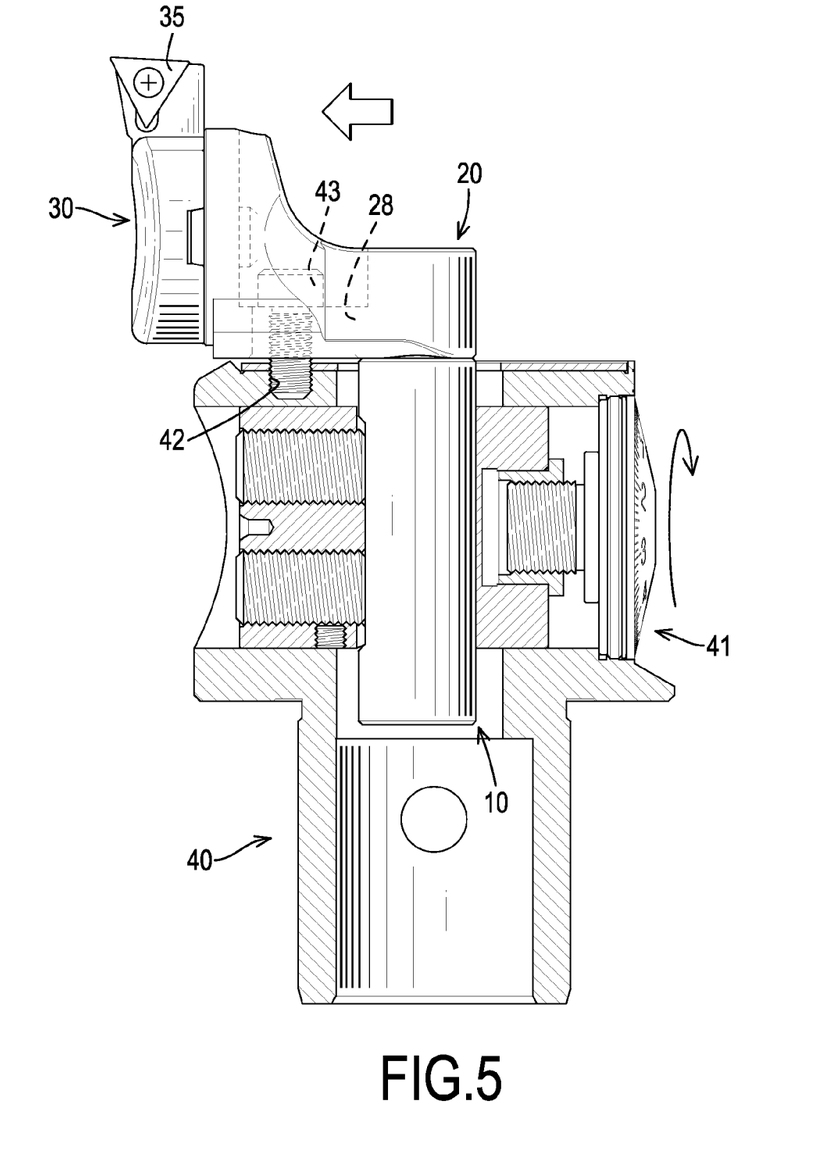
FIG. 5 is an operational side view in partial section of the boring head in FIG. 4 showing the boring head is latitudinally moved.

With reference to FIGS. 3 to 5, the boring head in accordance with the present invention is mounted on the adjusting base 40 and is to be moved latitudinally. The connecting rod 10 of the boring head is inserted into and positioned by the adjusting structure 41. The auxiliary bolt 43 is mounted through the auxiliary hole 28 and is screwed into the base threaded hole 42. Accordingly, the boring head is securely mounted on the adjusting base 40 for subsequent boring operation.

When the boring head is moved latitudinally, a desired diameter of a bore can be adjusted. The procedures of moving the boring head are as follows.

First, the auxiliary bolt 43 is loosened, and then the adjusting structure 41 is operated to move the boring head latitudinally to a desired position. Second, the auxiliary bolt 43 is screwed into the base threaded hole 42 again to secure the boring head.

Figure 6:
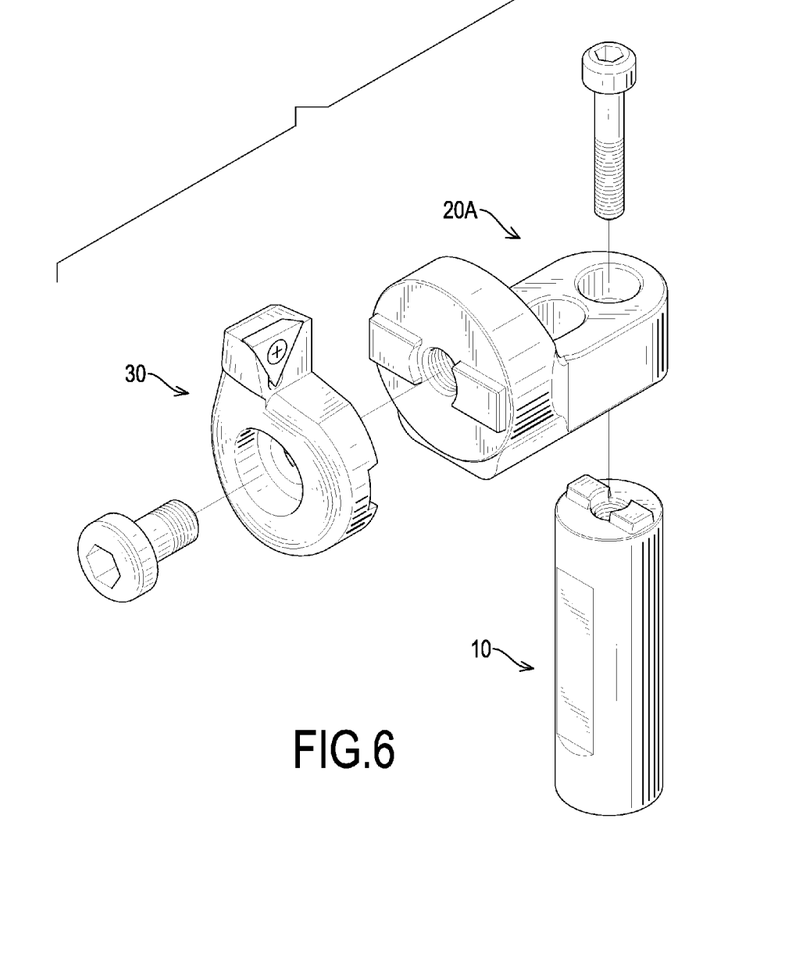
FIG. 6 is an exploded perspective view of a second embodiment of the boring head in accordance with the present invention.
Figure 7:
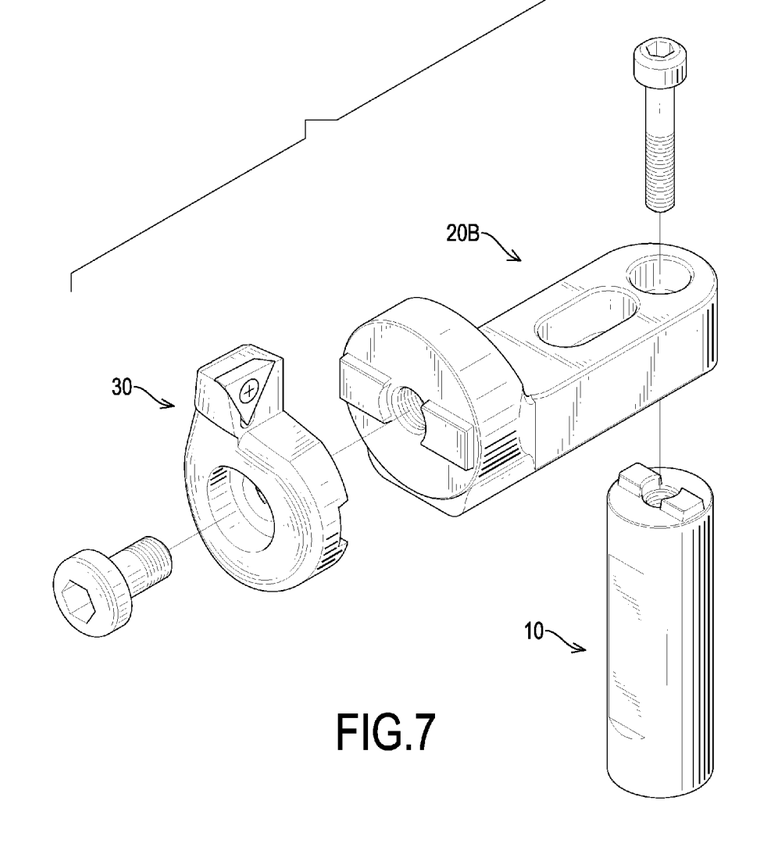
FIG. 7 is an exploded perspective view of a third embodiment of the boring head in accordance with the present invention.
Figure 8:
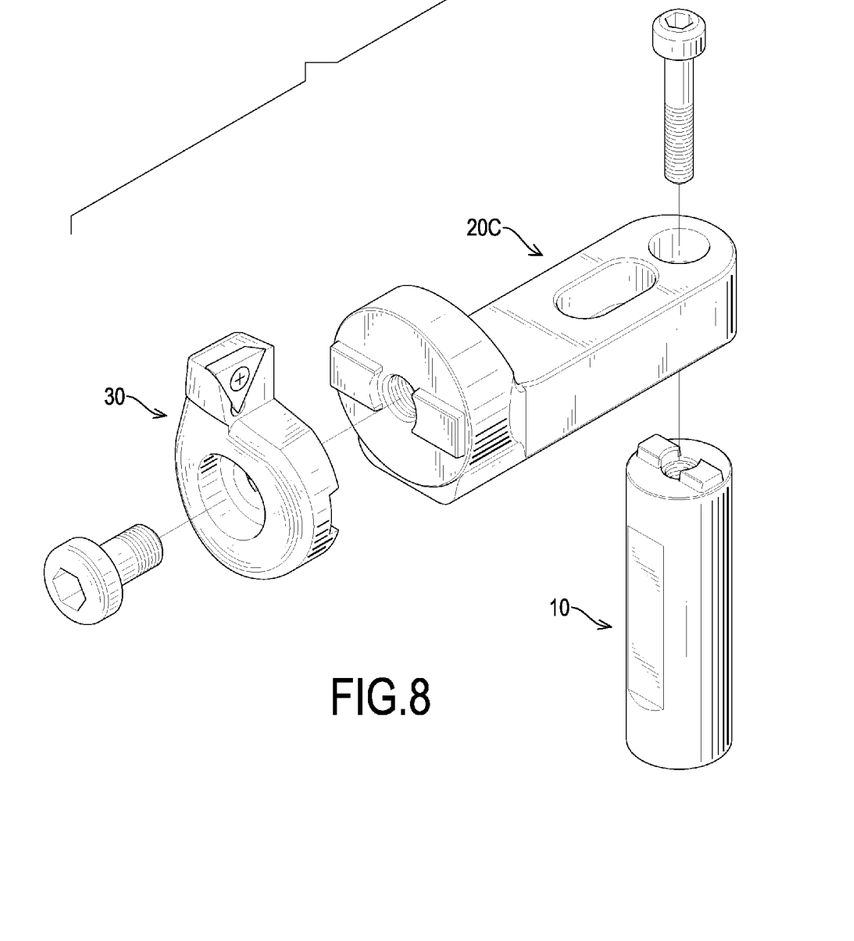
FIG. 8 is an exploded perspective view of a fourth embodiment of the boring head in accordance with the present invention.

Because the extending bracket 20 is detachably connected with the connecting rod 10, the extending bracket 20 is replaceable. When the desired diameter of the bore is large and beyond an adjusting range of the adjusting structure 41, the original extending bracket 20 can be replaced with another new extending bracket 20. For example, with further reference to FIGS. 6 to 8, second, third and fourth embodiments of the extending brackets 20A, 20B, 20C in accordance with the present invention have different lengths. The length of the extending bracket 20A of the second embodiment is longer than that of the extending bracket 20 of the first embodiment. The length of the extending bracket 20B of the third embodiment is longer than that of the extending bracket 20A of the second embodiment. The length of the extending bracket 20C of the fourth embodiment is longer than that of the extending bracket 20B of the third embodiment.

From the above description, it is noted that the present invention has the following advantages:

1. Replaceable structure:

Because the extending bracket 20, 20A, 20B, 20C is detachably connected with the connecting rod 10, the extending bracket 20, 20A, 20B, 20C is replaceable, and the length of the extending bracket 20, 20A, 20B, 20C can be changed to make a bore with a desired diameter.

2. Cost reduction:

The extending brackets 20, 20A, 20B, 20C having different lengths are prepared for replacement, instead of the whole boring heads. As the cost of the extending brackets 20, 20A, 20B, 20C is lower than the boring heads, the overall cost is remarkably reduced 3. Fast assembling:

Because the connecting rod 10 does not have to be disassembled from the adjusting base 40, the operation of adjusting diameter of the boring head is fast.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A boring head comprising:
    a linear connecting rod having
        a round cross section;
        an outer surface;
        a top surface having a central section;
        a flat pressed surface formed on the outer surface of the connecting rod; and
        a rod threaded hole formed in the central section of the top surface of the connecting rod;
    an extending bracket detachably connected with the connecting rod and having
        a main body extending horizontally and having
            a front end; and
            a rear end opposite to the front end of the main body;
            a flat abutted surface formed on an outer surface of the rear end of the main body, and abutting the top surface of the connecting rod;
            a bracket aperture formed through the rear end of the main body and aligning with the rod threaded hole; and
            an elongated auxiliary hole formed through the main body and extending toward the front end and the rear end of the main body;
        a bracket bolt mounted through the bracket aperture and screwed into the rod threaded hole; and
    a cutter mount securely connected with the front end of the main body and having
        a main portion; and
        a cutter-mounting protuberance formed on the main portion, protruding upwardly, and capable of being securely connected with a cutter by a screw, wherein
    the connecting rod has
        two rod protrusions protruding from the top surface of the connecting rod and respectively located at two opposite sides of an opening of the rod threaded hole; and
    the extending bracket has
        a bracket recess formed in the abutted surface and securely disposed around the two rod protrusions, wherein the bracket aperture is formed through a central section of a bottom of the bracket recess.

2. The boring head as claimed in claim 1, wherein
the main body of the extending bracket has
   a connecting section formed on the front end of the main body and having a longitudinally flat front surface;
   a bracket threaded hole formed in a central section of the front surface of the connecting section; and
   two bracket protrusions protruding from the front surface, respectively located at two opposite sides of an opening of the bracket threaded hole;
the main portion of the cutter mount has
   a front end;
   a rear end opposite to the front end of the main portion of the cutter mount and abutting the front surface;
   a mount recess formed in the rear end of the main portion and securely disposed around the two bracket protrusions; and
   a mount aperture formed through the front end and the rear end of the main portion and formed through a central section of the mount recess; and
the cutter mount has
   a mount bolt mounted through the mount aperture and screwed into the bracket threaded hole such that the cutter mount is securely connected with the extending bracket.

3. A boring head comprising:
a linear connecting rod having
   a round cross section;
   an outer surface;
   a top surface having a central section;
   a flat pressed surface formed on the outer surface of the connecting rod; and
   a rod threaded hole formed in the central section of the top surface of the connecting rod;
an extending bracket detachably connected with the connecting rod and having
   a main body extending horizontally and having
      a front end; and
      a rear end opposite to the front end of the main body;
      a flat abutted surface formed on an outer surface of the rear end of the main body, and abutting the top surface of the connecting rod;
      a bracket aperture formed through the rear end of the main body and aligning with the rod threaded hole; and
      an elongated auxiliary hole formed through the main body and extending toward the front end and the rear end of the main body;
   a bracket bolt mounted through the bracket aperture and screwed into the rod threaded hole; and
a cutter mount securely connected with the front end of the main body and having
   a main portion; and
   a cutter-mounting protuberance formed on the main portion, protruding upwardly, and capable of being securely connected with a cutter by a screw, wherein
the main body of the extending bracket has
   a connecting section formed on the front end of the main body and having a longitudinally flat front surface;
   a bracket threaded hole formed in a central section of the front surface of the connecting section; and
   two bracket protrusions protruding from the front surface, respectively located at two opposite sides of an opening of the bracket threaded hole;
the main portion of the cutter mount has
   a front end;
   a rear end opposite to the front end of the main portion of the cutter mount and abutting the front surface;
   a mount recess formed in the rear end of the main portion and securely disposed around the two bracket protrusions; and
   a mount aperture formed through the front end and the rear end of the main portion and formed through a central section of the mount recess; and
the cutter mount has
   a mount bolt mounted through the mount aperture and screwed into the bracket threaded hole such that the cutter mount is securely connected with the extending bracket.

* * * * *